United States Patent [19]

Jansen et al.

[11] Patent Number: 4,607,137

[45] Date of Patent: Aug. 19, 1986

[54] METHOD OF DISTRIBUTING AND UTILIZING ENCIPHERING KEYS

[75] Inventors: Cornelis J. A. Jansen; Andries J. M. van de Pas, both of Eindhoven; Pieter van der Vlist, Nootdorp; Frederik Hafkamp, The Hague, all of Netherlands

[73] Assignee: U.S. Philips Corporation, New York, N.Y.

[21] Appl. No.: 600,050

[22] Filed: Apr. 13, 1984

[30] Foreign Application Priority Data

Apr. 26, 1983 [NL] Netherlands ................. 8301458

[51] Int. Cl.<sup>4</sup> .............................................. H04L 9/00
[52] U.S. Cl. ................... 178/22.14; 179/1.5 R; 178/22.19
[58] Field of Search ............... 178/22.05, 22.09, 22.14, 178/22.19; 179/1.5 R

[56] References Cited

U.S. PATENT DOCUMENTS

| | | | |
|---|---|---|---|
| 4,140,873 | 2/1979 | Kinch, Jr. et al. | 178/22.14 |
| 4,177,355 | 12/1979 | Fleisher et al. | 178/22.05 |
| 4,182,933 | 1/1980 | Rosenblum | 179/1.5 R |
| 4,343,967 | 8/1982 | McArdle | 178/22.14 |
| 4,370,519 | 1/1983 | McArdle | 178/22.14 |
| 4,520,232 | 5/1985 | Wilson | 178/22.09 |

*Primary Examiner*—Salvatore Cangialosi
*Assistant Examiner*—Aaron J. Lewis
*Attorney, Agent, or Firm*—William J. Streeter; Leroy Eason

[57] ABSTRACT

In a communication network with cryptographically protected connections a unique key is used for each connection between two subscribers, so that when one or more keys fall into the hands of an unauthorized person it has no consequences for the protection of the remaining connections. In a network comprising N subscribers this implies that each participant must have N−1 keys for communication with the other participants. Such a set of N−1 keys is obtained by putting a column from a N×N key matrix (main diagonal empty) at the disposal of each participant. During the connection set-up the correct unique key is automatically selected by interchange of the column number. The key matrices used in the network can be regularly replaced without it being necessary to interrupt the operation of the network.

5 Claims, 4 Drawing Figures

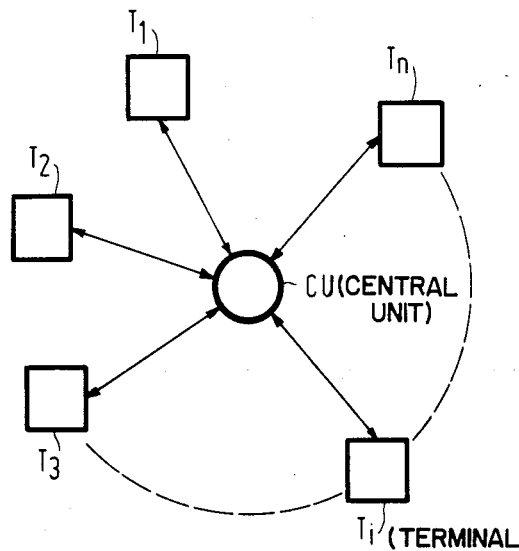
FIG.1
FIG.2
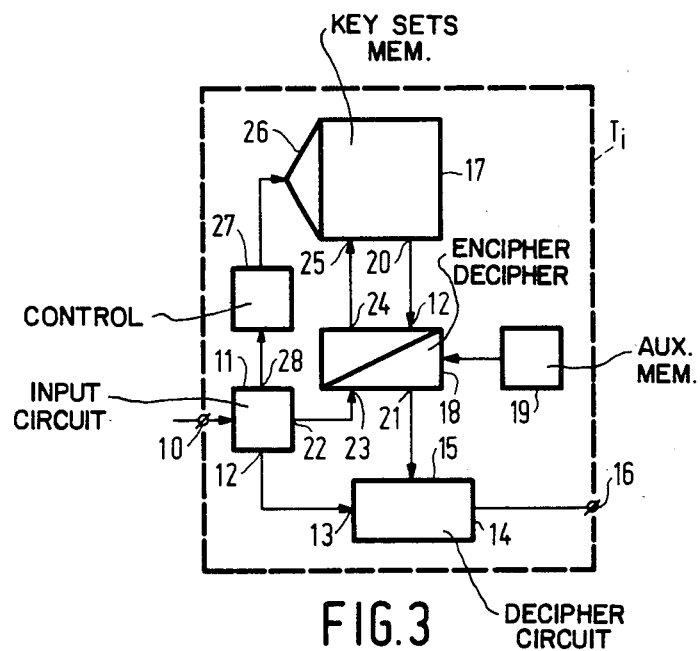
FIG.3

| matr. | kol | n-1 | | | | | matr. | kol | n | | | | | matr. | kol | n+1 | | | | |
|---|---|---|---|---|---|---|---|---|---|---|---|---|---|---|---|---|---|---|---|---|
| | | D | B | C | A | E | | | B | E | D | C | A | | | E | C | A | B | D |
| | | 1 | 2 | 3 | 4 | 5 | | | 1 | 2 | 3 | 4 | 5 | | | 1 | 2 | 3 | 4 | 5 |
| $M_a^t$ | 1 | a1 | a2 | a3 | a4 | a5 | $M_c^t$ | 1 | c1 | c2 | c3 | c4 | c5 | $M_e^t$ | 1 | e1 | e2 | e3 | e4 | e5 |
| | 2 | a6 | a7 | a8 | a9 | a10 | | 2 | c6 | c7 | c8 | c9 | c10 | | 2 | e6 | e7 | e8 | e9 | e10 |
| | 3 | a11 | a12 | a13 | a14 | a15 | | 3 | c11 | c12 | c13 | c14 | c15 | | 3 | e11 | e12 | e13 | e14 | e15 |
| | 4 | a16 | a17 | a18 | a19 | a20 | | 4 | c16 | c17 | c18 | c19 | c20 | | 4 | e16 | e17 | e18 | e19 | e20 |
| | 5 | a21 | a22 | a23 | a24 | a25 | | 5 | c21 | c22 | c23 | c24 | c25 | | 5 | e21 | e22 | e23 | e24 | e25 |
| $M_b$ | 1 | - | b1 | b2 | b3 | b4 | $M_d$ | 1 | - | d1 | d2 | d3 | d4 | $M_f$ | 1 | - | f1 | f2 | f3 | f4 |
| | 2 | b1 | - | b5 | b6 | b7 | | 2 | d1 | - | d5 | d6 | d7 | | 2 | f1 | - | f5 | f6 | f7 |
| | 3 | b2 | b5 | - | b8 | b9 | | 3 | d2 | d5 | - | d8 | d9 | | 3 | f2 | f5 | - | f8 | f9 |
| | 4 | b3 | b6 | b8 | - | b10 | | 4 | d3 | d6 | d8 | - | d10 | | 4 | f3 | f6 | f8 | - | f10 |
| | 5 | b4 | b7 | b9 | b10 | - | | 5 | d4 | d7 | d9 | d10 | - | | 5 | f4 | f7 | f9 | f10 | - |
| $M_c$ | 1 | c1 | c6 | c11 | c16 | c21 | $M_e$ | 1 | e1 | e6 | e11 | e16 | e21 | $M_g$ | 1 | g1 | g6 | g11 | g16 | g21 |
| | 2 | c2 | c7 | c12 | c17 | c22 | | 2 | e2 | e7 | e12 | e17 | e22 | | 2 | g2 | g7 | g12 | g17 | g22 |
| | 3 | c3 | c8 | c13 | c18 | c23 | | 3 | e3 | e8 | e13 | e18 | e23 | | 3 | g3 | g8 | g13 | g18 | g23 |
| | 4 | c4 | c9 | c14 | c19 | c24 | | 4 | e4 | e9 | e14 | e19 | e24 | | 4 | g4 | g9 | g14 | g19 | g24 |
| | 5 | c5 | c10 | c15 | c20 | c25 | | 5 | e5 | e10 | e15 | e20 | e25 | | 5 | g5 | g10 | g15 | g20 | g25 |

FIG. 4

METHOD OF DISTRIBUTING AND UTILIZING ENCIPHERING KEYS

The invention relates to a method of distributing and utilizing enciphering keys in a system comprising a number of (N,N>2) transceivers, these transceivers being interconnectable for transmitting enciphered messages.

Such a method is used in telephony systems, computer networks and such like, where cryptographically protected connections between terminals or between a terminal and a central unit are required. More specifically in systems in which a very large number of terminals, telephone sets or transceivers are interconnected (at least interconnectable) in a network structure, there is a need to ensure that compromising of one or more keys has no consequences for the remaining connections.

It is an object of the invention to provide a method of distributing and utilizing enciphering keys with which it is accomplished that when one or more keys are compromised this has no consequences for the security of the remaining connections. According to the invention, the method of distributing and utilizing enciphering keys, described in the opening paragraph, is characterized in that each transceiver has an initial set of keys of which in all cases a unique key is reserved for the communication with one of the other transceivers, that each key of one set is an element of a column of a first $N \times N$ keys matrix and the number of the column is associated with the identity of the transceiver, that prior to the start of the communication between two transceivers their column numbers are exchanged and that the two transceivers are automatically adjusted to their common key.

An advantage is that if a key is found by crypto-analysis, only one connection between two specific transceivers is compromised. Moreover, if one or more terminals fall into the hands of an unauthorized person, only those connections are compromised in which these terminals are involved.

This method is particularly applicable in those cases where the system needs to be made operative only during a comparatively short period of time, for example during military or civil training or operations, as then there is the opportunity after an action has ended to replace the sets of keys of all the N terminals by new sets which new sets together provide a new $N \times N$ matrix.

When the system is uninterruptedly in operation, it is advisable, for cryptographical reasons, to replace the used keys regularly.

The invention has for its further object to provide a method of distributing and utilizing enciphering keys by means of which the keys of all the transceivers are replaced by new keys without the communication being interrupted.

According to the invention, an embodiment of the method is characterized in that initially each transceiver has, in addition to the said older sets of keys from the first key matrix, a second newer set of keys from a second new key matrix, that prior to the start of the communication between two transceivers not only their column number in the first key matrix but also their column number in the second key matrix and the identity of the two matrices are interchanged, that the two transceivers are automatically adjusted to the most recent common key, that in a first period of time a new set of keys is transmitted separately to each receiver to replace their older set of keys and that in second and subsequent periods of time a new set of keys is in all cases transmitted separately to each transceiver separately to replace their oldest set of keys.

According to the invention a variation of the method is characterized in that initially each transceiver has in addition to the said older set of keys from the first key matrix a second and a third set of keys from a second and a third key matrix, respectively, that in a first time period new sets of keys are transmitted separately to each transceiver, which new sets are columns from a new first, a new second and a new third key matrix, respectively, that in a second time period and in subsequent time periods, just as in the first time period the set of keys associated with the first, second and third key matrices are replaced, that prior to the start of the communication between two transceivers not only their column numbers but also the number of the time period are interchanged and that the transceivers are automatically adjusted to the common key from the appropriate matrix.

These two embodiments have the advantage that because of the gradual and continous distribution substitution of the keys can be effected without the operation being disturbed. In addition, the first and second embodiments according to the invention each have their specific advantages which will be further described hereinafter.

The method according to the invention will now be further described by way of example with reference to the drawing. Therein:

FIG. 1 shows a block diagram of a system in which the method according to the invention can be employed;

FIG. 2 shows a key matrix as used in the method according to the invention;

FIG. 3 shows an embodiment of a transceiver with which the method according to the invention can be performed;

FIG. 4 shows a key matrix system such as it is used in a variation of the method according to the invention.

FIG. 1 shows block-schematically a communication system wherein $T_1, T_2, \ldots T_i, T_n$ denote terminals, telephone sets or transceivers, depending on whether a data communication, a telephone communication or a radio communication system is involved. In addition, the system comprises a central unit CU which can communicate with each of the transceivers $T_i (i=1, 2, \ldots n)$. When the system is a telephone network, the central unit is often also the central exchange via which the communication between two subscribers is established. If the system is a data network the central unit CU is often also the data switching exchange. In the event of radio communication the central unit will generally have no function in the transmission path from transmitter to receiver and vice versa. For the sake of simplicity, arrangements $T_i$ will only be designated as transceivers in the further course of the description, although the invention is not limited thereto.

Enciphering techniques can be used to protect the transmitted information. According to the invention, a method is proposed by means of which for any connection between two transceivers in the system a unique key is used, so that compromising of one or more keys will be without consequences for the remaining connections. In addition, in systems comprising a very large number of transceivers the chance of a transceiver falling into the hands of an unauthorized third person (physical compromising) is not so remote as to be disregarded. For that reason in a system comprising N transceivers each transceiver is given N−1 keys, that is to say one unique key for communication with any other transceiver. So a total of $$\binom{N}{2} = \tfrac{1}{2} N(N-1)$$

unique keys are required for the entire system. This principle can be described on the basis of the key matrix shown in FIG. 2, for a system formed by five transceivers $T_A$, $T_B$, ... $T_E$ of participants A, B, ... E respectively. Each transceiver Ti has at its disposal the set of keys k shown in its column. During setting up of the connection the column identities are automatically exchanged between the two transceivers, whereafter both sets can automatically select the appropriate, unique key. The subsequent communication is then protected. If, for example, transceivers $T_A$ and $T_E$ want to communicate with each other, then transceiver $T_A$ transmits its column identity (2) to transceiver $T_E$ and transceiver $T_E$ transmits its column identity (4) to transceiver $T_A$. Both transceivers select their common key ($k_{24}$), independently from each other, with which both transceivers thereafter encipher their communication.

It is irrelevant which transceiver gets which column identity, since the transceivers exchange their column identity.

For reasons of cryptography, it is advisable to use a given key matrix only during a certain period of time. For that reason it is proposed to replace the key matrix regularly by a different matrix. This can be effected by collecting all the transceivers and providing each transceiver with a new set (column in the matrix) of keys. When, for example, the transceivers are used during occassional operations of a limited duration this can readily be done. It is alternatively possible to provide all transceivers remotely with new sets of keys during an interruption, forced or not forced, of the communication.

If now, the system needs to be provided with new sets of keys without interruption in the communication it is necessary to replace the key columns by new key columns for all sets simultaneously. This is, however, not practicable without interrupting the operations.

A solution of this problem is to replace the key matrix gradually and continously, each transceiver having the disposal of a set of keys from two different matrices, namely one from the so-called "old" matrix and one from the so-called "new" matrix. During the setting-up phase of the connection the transceivers now automatically exchange the identities of their matrices and columns and automatically select the key from the "new" matrix column they have in common.

EXAMPLES
(see also FIG. 2)

$T_A$ has column 2 from matrix 1 and column 4 from matrix 2

$T_B$ has column 1 from matrix 2 and column 3 from matrix 3

$T_C$ has column 5 from matrix 2 and column 2 from matrix 3 where $T_A$, $T_B$, $T_C$ denote the transceivers of participants A, B and C, respectively.

For the connections the following matrices and columns, respectively will then be used:
connection $T_A$ to B: matrix 2, key $k_{14}$
connection $T_A$ to C: matrix 2, key $k_{45}$
connection $T_B$ with C: matrix 3, key $k_{23}$.

The continuative distribution of the keys will however, not take place until all the transceivers have received a column from the previous matrix.

FIG. 3 shows an embodiment of a transceiver Ti suitable for performing the method.

In a transceiver Ti two sections can be distinguished: a transmit section and a receive station. This last section will first be described in greater detail. The signal received is applied to an input 10 of input circuit 11 of the transceiver. The input circuit has for its object to demodulate, regenerate, filter etc. the received signal in known manner, depending on the nature of the transceiver. The enciphered input signal is applied via a first output 12 of input circuit 11 to an input 13 of deciphering arrangement 14 where the enciphered input signal is mixed in known manner with the enciphering key applied to the control input 15 of deciphering arrangement 14. The deciphered, plain version of the input signal is then available at an output 16 of deciphering arrangement 14. In the memory locations of a storage device 17 the sets (columns) of the keys to be used are stored. Each key is formed by approximately 100 bits. When the system comprises a total of 5000 transceivers and when two matrices are used, then the storage device must have a capacity of approximately 1 Mbit. Storage device 17 may, for example, be a "bubble" memory.

For reasons of safety, the keys are not stored in storage device 17 in the plain form but in the enciphered form. Therefore, writing new key information and reading the keys present is effected via a deciphering/enciphering arrangement 18 and an auxiliary store 19 connected thereto. A read, enciphered key which becomes available at an output 20 of the storage device 17 is deciphered by the deciphering/enciphering arrangement 18 by means of the auxiliary key contained in the auxiliary store 19, and applied to input 15 of the deciphering arrangement 14 via a first output 21 of the deciphering/enciphering arrangement 18.

The auxiliary store 19 is an easily erasable memory and is arranged such that in certain circumstances the stored auxiliary key can be erased or at least made unusable immediately and independently of the operating state of the apparatus (particularly also the voltageless, inactive state).

The new key information, that is to say a set of keys associated with a new matrix to replace the oldest, present set of keys is enciphered by the deciphering/enciphering arrangement 18 before it is stored in the storage device 17. To that end a second output 22 of input circuit 11 is connected to a second input 23 of the deciphering/enciphering arrangement 18. The set of enciphered keys available at a second output 24 after enciphering is applied to an input 25 of the storage device 17.

The storage locations of storage device 17 are addressed by address decoder 26 coupled thereto. The addressing information (the column identity and the matrix indentity) are applied to control element 27 via a third output 28 of the input circuit. Control element 27 determines the storage address from the information received and applies it to the address decoder.

In principle, a transceiver Ti has three types of active states, namely the setting-up, the communication and the key distribution states. During the setting-up phase the input circuit 11 transfers the column and matrix identity of the calling transceiver to control element 27 and conversely the control element 27 transfers the identity of the transceiver called to the caller via the input circuit 11. On the basis of this information both participants choose automatically the appropriate key.

In the communication state the received enciphered information is transferred via input circuit 11 to deciphering arrangement 14, which deciphers on the basis of the key determined in the setting-up phase the information applied.

In the key distribution state input circuit 11 writes via enciphering/deciphering arrangement 18 the received new set of keys into storage device 17 in the locations determined by control element 27. It will be obvious that the distribution of new sets of keys cannot started until all the transceivers have a set of keys associated with the previous matrix. In addition, it is desirable to keep a number of sets of keys (and consequently columns in the matrix) as spare keys to prevent a transceiver becoming unusable or usable only to a limited extent during a given period of time when it losses its regular key content (whatever the reason).

Some advantages of such a method are:
(1) compromising one or more keys has no consequences as regards the protection of the other connections,
(2) a change to new keys can be made at any instant and without interrupting the communication
(3) the system can easily be extended as the transceivers can be dimensioned without any significant additional cost to a very large end capacity of the system, which also results in that the initial investments, also for a small system can be low and will gradually increase versus an increasing size.

In addition, the transceiver Ti comprises a transmit section, not shown further in the drawing, by which the plain text to be transmitted, after enciphering, is transmitted in known manner to one or more other transceivers. To that end the transceiver Ti comprises an enciphering arrangement which in practice is usually combined with the deciphering device 14. It is, however, also conceivable that the deciphering/enciphering arrangement 18 and the deciphering arrangement 14 when also extended to form a deciphering/enciphering arrangement can be combined to form one and the same deciphering/enciphering arrangement.

A variation of the above-described two-matrix system is the three-matrix system. In such a system the transceivers are each given three columns from three different matrices, the entire memory content (of storage device 17, for example) being replaced during the continuative distribution by three new columns. It is alternatively possible to distribute instead of three columns from three matrices one column (consisting of 3N elements) from one supermatrix ($3N \times N$).

The first column is any column from the transposed third matrix of the preceding period, transmitted to each transceiver. This implies that a complete matrix with keys must always be kept centrally.

The third and second columns are transmitted to the transceivers and originate from newly generated matrices. FIG. 4 shows an example of a key matrix system for five transceivers, more specifically for three consecutive time periods namely $(n-1)$, $n$ and $(n+1)$. The uppermost matrices ($M_a{}^t$, $M_c{}^t$ and $M_e{}^t$) are the matrices which are determined by transposition of the third matrix ($M_a$ (not shown), $M_c$ and $M_e$) of the preceding period (period $n-2$ (not shown), $n-1$ and $n$). In the setting-up phase of a connection the transceivers now automatically exchange the period number and column identities and automatically select the common key from the appropriate matrix.

EXAMPLES

1. Transceiver $T_A$ (period n) with transceiver $T_B$ (period n): key $d_4$.
2. Transceiver $T_A$ (period n) with transceiver $T_B$ (period $n-1$): key $c_{10}$.
3. Transceiver $T_A$ (period n) with transceiver $T_B$ (period $n+1$): key $e_{24}$.

Generally the situation is such that transceivers having keys from the same period (example 1) are always limited to a key from the central matrix ($M_d$, example 1), whereas transceivers having keys from mutually different periods are limited to keys from the first and third matrices ($M_c$, $M_c{}^t$ in example 2; $M_e$, $M_e{}^t$ in example 3), respectively.

It will be obvious that a new distribution period is not started until all the transceivers in the preceding period have been provided with new columns.

If for any reason whatsoever the key content of a set is lost, it will be sufficient, if the set must again be suitable for use in the entire network, to proceed earlier to a next distribution period. This means that no spare columns of a matrix need to be available.

The three-matrix method has the following advantages compared with the two-matrix method: (1) the key material is replaced in each period as a result of which charging and storage procedures can be simplified and (2) because of the possibility of proceeding at an earlier moment to a subsequent distribution period no stock of spare columns is required and—which is more important—the possibility that a stock of spare columns is exhausted does not then exist.

The two-matrix method has also specific advantages compared with the three matrix system, namely (1) fewer keys need to be stored in the storage arrangement of the transceiver ($\frac{2}{3}$); the maximum number of transceivers at a given storage capacity is consequently larger, (2) fewer keys need to be generated for each continuative distribution ($\frac{1}{3}$) and (3) less key material need to be kept, namely only some spare columns instead of a complete (non-symmetrical) matrix.

What is claimed is:

1. A method of distributing and utilizing enciphering keys in a system comprising a number of (N,N>2) transceivers, these transceivers being interconnectable for transmitting enciphered messages, characterized in that each transceiver has an initial set of keys enciphering of which in all cases a unique key is reserved for communication with each one of the other transceivers, that each key of such set is an element of a column of a first $N \times N$ key matrix and the number of the column is associated with the identity of the transceiver, and that prior to the start of communication between two transceivers their column numbers are exchanged and the two transceivers are automatically adjusted to their unique key.

2. A method of distributing and utilizing enciphering keys as claimed in claim 1, characterized in that the initial sets of keys of all the N-transceivers are gradually and continuously replaced by new sets of keys which new sets together provide a new $N \times N$ key matrix.

3. A method of distributing and utilizing enciphering keys as claimed in claim 1, characterized in that initially each transceiver has, in addition to the said initial set of keys from the first key matrix, a second set of enciphering keys from a second newer key matrix, that prior to the start of the communication between two transceivers not only their column numbers in the first key matrix but also their column number in the second key matrix and the identity of the two matrices are interchanged, that the two transceivers are automatically adjusted to their most recent unique key, that in a first period of time a new set of keys is transmitted separately to each transceiver to replace their older set of keys and that in second and subsequent periods of time a new set of keys is in all cases transmitted separately to each transceiver to replace their oldest set of keys.

4. A method of distributing and utilizing enciphering keys as claimed in claim 1, characterized in that initially each transceiver has in addition to the said initial set of keys from the first key matrix a second and a third set of keys from a second and third key matrix, respectively, that in a first time period new sets of keys are transmitted separately to each transceiver which new sets are columns from a new first, new second and new third key matrix, respectively, that in second and subsequent periods of time the sets of keys associated with the first, second and third key matrices are replaced, that prior to the start of communication between two transceivers not only their column members but also the number of the time period is interchanged and that the transceivers are automatically adjusted to their unique key from the appropriate matrix.

5. A method of distributing and utilizing enciphering keys as claimed in claim 4, characterized in that the set of keys associated with the first key column is obtained by choosing any column from the transposed third key matrix of the preceding time period.

* * * * *